Figure 1:
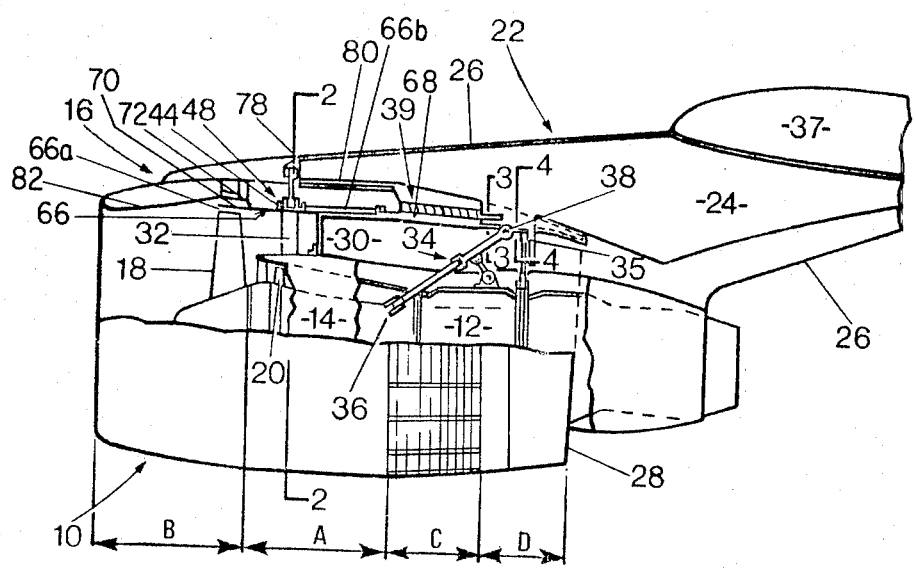

United States Patent [19]
Morris

[11] 3,750,983
[45] Aug. 7, 1973

[54] GAS TURBINE DUCTED FAN ENGINES FOR AIRCRAFT

[75] Inventor: Geoffrey William Morris, Breaston, England

[73] Assignee: Rolls-Royce Limited, Derby, England

[22] Filed: Aug. 9, 1971

[21] Appl. No.: 169,971

[30] Foreign Application Priority Data
Aug. 11, 1970   Great Britain.................. 38,570/70

[52] U.S. Cl. .............................. 244/54, 60/226 R
[51] Int. Cl. ............................................ B64d 27/12
[58] Field of Search .................. 244/53 R, 53 B, 54; 60/226, 39.31, 262

[56] References Cited
UNITED STATES PATENTS

| | | | |
|---|---|---|---|
| 3,540,682 | 11/1970 | Dibble............................. | 244/53 R |
| 3,541,794 | 11/1970 | Johnston et al................ | 60/39.31 X |
| 3,318,554 | 5/1967 | Ward et al........................... | 244/54 |

FOREIGN PATENTS OR APPLICATIONS

| | | | |
|---|---|---|---|
| 1,157,062 | 5/1958 | France............................. | 60/39.31 |

Primary Examiner—Milton Buchler
Assistant Examiner—E. R. Kazenske
Attorney—Cushman, Darby & Cushman

[57] ABSTRACT

In a ducted fan gas turbine engine that part of the fan duct outer wall which extends over the tips of the fan blades, is connected to inter alia the fan air intake in a non-load bearing manner and is thus unaffected by way of deformation when the fan air intake is acted upon by adverse wind conditions. Thus, fouling of the fan blades is avoided. Moreover the fan intake outer wall can be made from relatively light materials.

7 Claims, 6 Drawing Figures

PATENTED AUG 7 1973
3,750,983
SHEET 1 OF 3

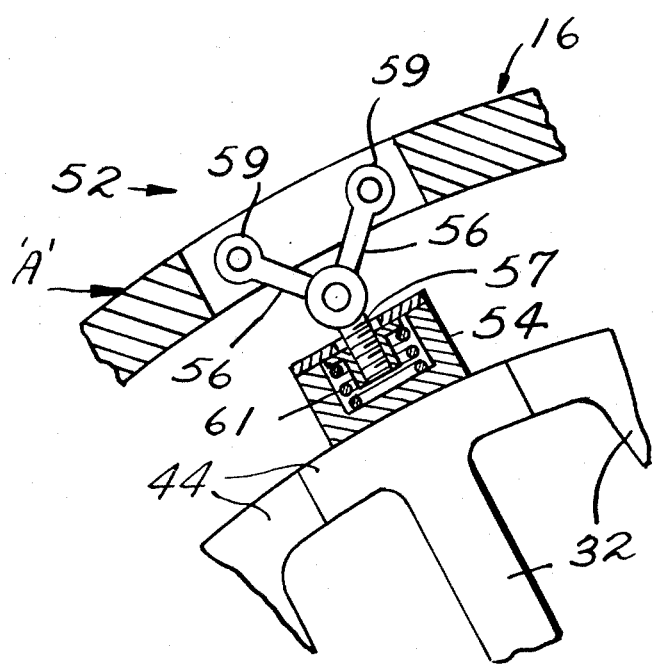

GAS TURBINE DUCTED FAN ENGINES FOR AIRCRAFT

This invention concerns gas turbine ducted fan engines for aircraft.

It is an object of this invention to provide a gas turbine ducted fan engine in which the fan duct outer wall is relieved of all axial thrust loads produced by the engine and thrust reverser.

It is a further object of this invention to relieve the fan duct outer wall of mechanical loads exerted thereon by the fan air intake structure, which structure is in operation, acted upon by intake air.

Accordingly the present invention comprises a gas turbine ducted fan engine having a fan cowl, of which that part which forms the fan duct outer wall is separate therefrom but is integral with the gas generating core engine which is adapted for suspension from a pylon by suspension means adjacent each end thereof and has anti rotating means provided on at least one of said suspension means, the upstream end of the remainder of the fan cowl of the gas turbine ducted fan engine being non fixedly supported in spaced apart relationship at one end by the core engine the downstream end of said fan cowl being adapted for single point articulate jointing to said pylon.

The gas generating core engine is provided with thrust transmitting means whereby in operation, thrust produced by the gas generating core engine is directly transmitted to said pylon.

Preferably the thrust transmitting means comprises a link mechanism one end of which is pivotally attached to the gas generating core engine and the other end of which is adapted for pivotal attachment to said pylon the arrangement being such that on assembly the other attachment point is downstream of the one attachment point.

Preferably fan flow thrust reversing means are provided in the remainder of the fan cowl structure and provides the connection between the fan cowl and pylon such that at least some of the loads experienced in operation by the thrust reversing means, are transmitted directly to the pylon.

Preferably a stage of outlet guide vanes are rigidly attached to the outer periphery of the gas generating core engine adjacent its upstream end and in equi-angularly spaced apart relationship with each other, the outlet guide vanes being connected to each other at their outer extremities by shrouds so as to form an annulus which is defined by the gas generating core engine and shrouds.

Preferably a cylindrical portion is rigidly attached to the upstream and downstream edges of the shrouds so as to extend said annulus, the upstream cylindrical portion extending upstream sufficiently to axially overlap with a radial clearance therebetween, the outer extremities of the fan blades of the fan part of the gas turbine ducted fan engine, the two cylinders and outlet guide vanes together forming the fan duct outer wall.

Preferably the fan cowl includes a fan air intake at its upstream end the inner wall of said intake extending downstream from the intake lip to a point overlapping the upstream end of the upstream cylindrical portion of the fan duct in radially spaced apart relationship therewith, such that in operation, fan intake boundary layer air may pass through said space in a downstream direction.

Preferably valve means are provided whereby said boundary layer air is prevented from flowing upstream through said space.

Preferably said valve means comprises a flexible diaphragm.

Figure 2:
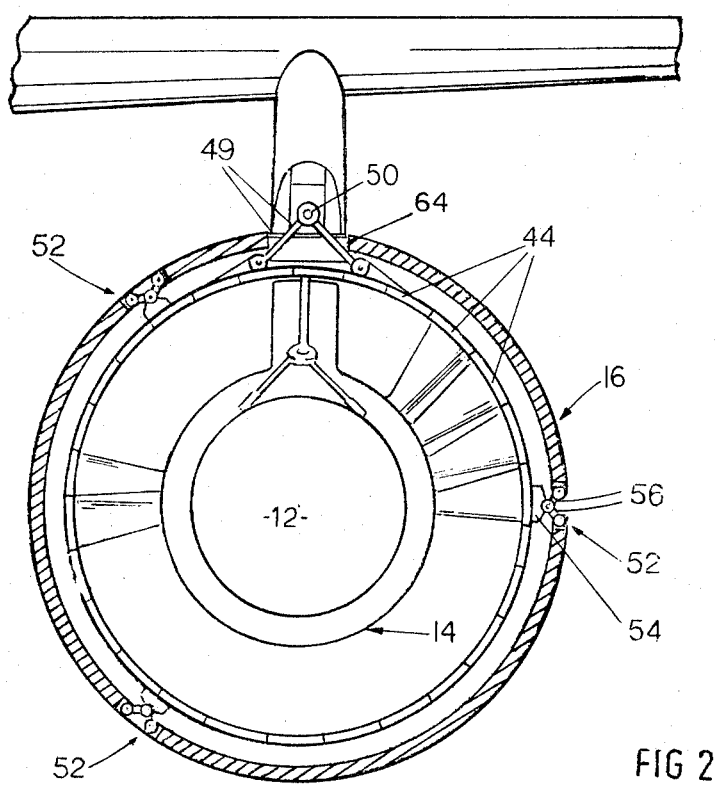
Figure 3:
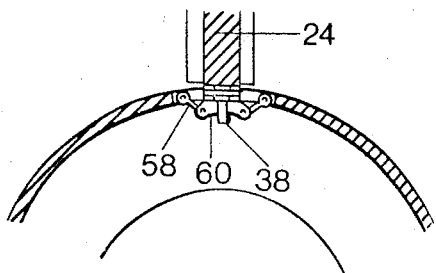
Figure 4:
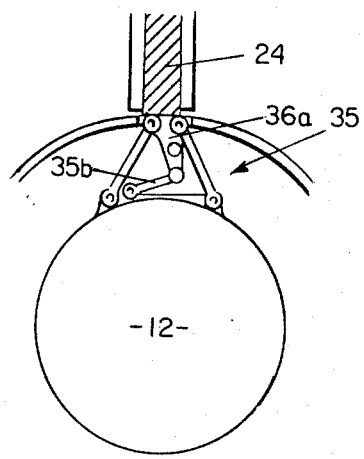
Figure 5:
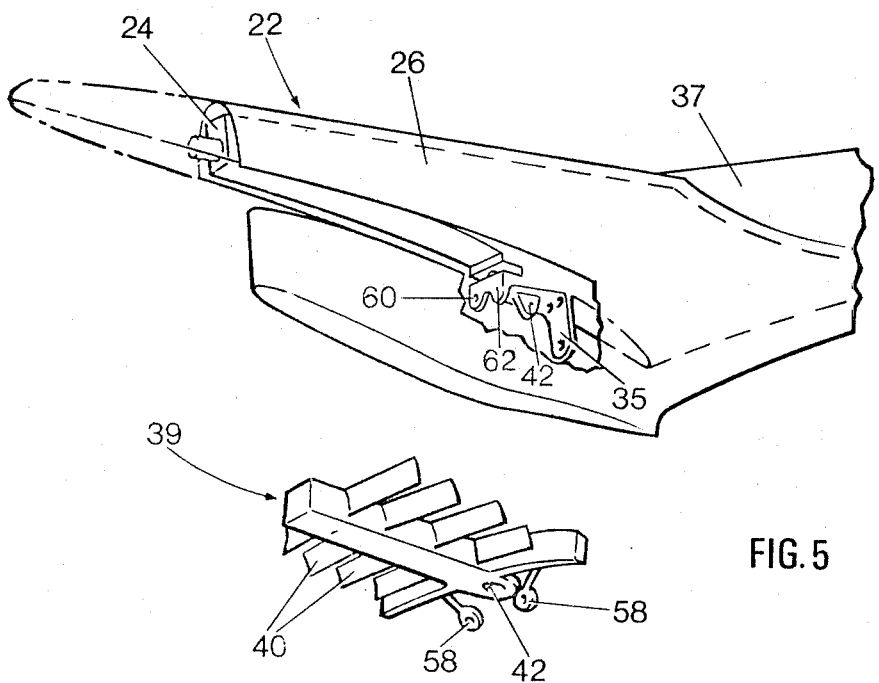

The invention will now be described with reference to the accompanying drawings in which:

FIG. 1 is a partly axially sectioned view of a gas turbine ducted fan engine.
FIG. 2 is a view on line 2—2 in FIG. 1.
FIG. 3 is a view on line 3—3 in FIG. 1.
FIG. 4 is a view on line 4—4 in FIG. 1.
FIG. 5 is an exploded part view of the gas turbine ducted fan engine suspension means.
FIG. 6 is an enlarged fragmentary view of the spacer mechanisms shown in FIG. 2, the view being partly in elevation and partly in section.

In FIG. 1 a gas turbine ducted fan engine is indicated generally by the numeral 10 and in detail, comprises a gas generator core engine 12 surrounded by a casing 14, the engine and casing being coaxially disposed within a fan cowl 16. Upstream of and coaxially with core engine 12 there is a single stage of fan blades 18 which may be drivingly connected to a free turbine or a low pressure turbine, neither of which are shown, or to the low pressure compressor 20 of core engine 12.

Throughout this specification, the terms "upstream" and "downstream" where used, are used in relation to the normal direction of flow of gases through the gas turbine ducted fan engine 10, as will be understood by those skilled in the art. Moreover it is to be understood that the term "fan cowl" is used to denote the tubular structure which surrounds the fan blades and core engine and includes within its length the fan air inlet and fan air exhaust nozzle.

The gas turbine ducted fan engine as a whole depends from a pylon structure 22 which comprises a rigid beam 24 (FIGS. 2, 3 and 4) encased in a streamlined skin 26. Skin 26 extends from fan nozzle 28 through a fan duct 30 defined by cowl 16 and core engine 12, to a position just downstream of a ring of fan outlet guide vanes 32. That portion of skin 26 which is in fan duct 30 encloses core engine restraining and suspension structure 34 and 35 respectively the construction and use of which is described hereafter.

Suspension means 35 comprises a pair of links (FIG. 4) which suspends one end of core engine 12 and its casing 14 directly from a rigid bracket 35a which is integral with beam 24. A third link 35b is connected at one end to an extension of bracket 35a and at its other end to core engine 12, the arrangement being such that core engine 12 is held against torque loads which may be exerted on it during operation.

Core engine 12 has further suspension means 48 adjacent its upstream end, which means comprise a pair of links 49 (FIG. 2) the radially inner ends of which are attached to a bracket formed on the shrouds 44 of outlet guide vanes 32, the outer ends being fastened directly to rigid beam 24 at 50. Thus it will be seen that the total weight of core engine 12, casing 14 is absorbed entirely by rigid beam 24.

Thrust reversing apparatus 39 as known in the art is included in fan cowl 16.

In operation, thrust produced by the core engine 12 reacts in a manner which pushes engine 12 in an upstream direction. However core engine restraining structure 34 restrains this movement by virtue of its connection 36 at one end to core engine 12 and its connection 38 at the other end to rigid beam 24. As can be seen in FIG. 1 the restraining action puts the restraining structure 34 in tension and loads created by core engine thrust are directly absorbed by the rigid beam 24.

It is important to maintain restraining structure 34 in tension during operation so as to prevent buckling thereof, though at first sight it would not appear that this condition is achieved when reverse thrust is selected, for if forward thrust from the engine puts the structure 34 in tension, it would seem that reverse thrust from fan 18 would put structure 34 in compression and so buckle it. However, as can be seen in FIG. 5 the reverser which comprises an annular array of cascades 40 is connected by ball joint 42 directly to rigid beam 24. Because reverser cascade 40 is substantially annular, loads created by reverse thrust will tend to make the reverser as a whole, a moment arm, ball joint 42 being the point about which the moment acts. Even so, the result is to maintain restraining structure 34 in tension, for as will be described later in this specification, further suspension means 48 partly nullifies the moment effect caused by reverse thrust loads and converts the apparent compression load to a tensile load.

As described so far it will be seen that none of those loads which are created by forward thrust from the engine have been transmitted directly to cowl 16. This means of course that cowl 16 can be made from a light structure with its attendant inherent advantages. However, there are other loads of less magnitude than thrust loads which must be controlled, these other loads causing slight relative rotation or twisting between the gas turbine core engine casing 14 and the fan cowl 16, and to achieve this control there are provided three spacer mechanisms 52 equi-angularly spaced about the outer diameters of shrouds 44. Each mechanism comprises an internally screwed boss 54 which abuts a respective shroud 44 and a pair of links 56 pivotally attached at one end to the end of a screwed stud 57 and at their other ends 59 to fan cowl 16, said other ends being spaced apart. (FIG. 2) The arranging of the links 56 in this manner causes them to act against each other and so restrain relative radial movement between cowl 16 and engine casing 14.

It is spacer mechanisms 52 which at least partially nullifies the moment arm effect of reverser 39 during thrust reversal. The forces exerted by thrust reversal tend to bend cowl 16 about ball joint 42 in an anti-clockwise direction as viewed in FIG. 1. This causes cowl 16 to press spacers 52 onto shrouds 44, and because shrouds 44 are directly attached by links 49 to rigid beam 24, they put tension on links 49 which resist movement and cause an equal and opposite reaction on the uppermost guide vanes 32 (FIG. 1). The load is now passing radially outwards through guide vanes 32 and it is restrained by link mechanism 34 which is therefore in tension although thrust direction has been reversed.

Thrust reversing apparatus 39 is held against torque loads by links 58, the outer ends of which are pivotally attached to cascade 40 and the inner ends to lubs 60,62 on rigid member 24 (FIG. 5) in such a manner as to cause them to act against each other should attempts to twist be made by the reverser.

Mechanisms 52 can, by manipulation of the threaded portions, be used to correctly space shrouds 44 from fan cowl 16. If it is required to allow for differential expansion between shrouds 44 and fan cowl 16, resilient means 61 (FIG. 6) may be introduced such that a nominal spacing may be achieved by the manipulation of the threaded portions and a certain degree of relative radial movement between parts 44 and 16 allowed by virtue of the resilient means 61.

There remains the construction of fan cowl 16 which, as has been shown, is separate from core engine 12 and its associated casing 14 except for the abutment of the spacer mechanisms 52 and is also separate from rigid beam 22 except for ball joint 42 and anti-torque links 58.

Cowl 16 consists of the following parts.

Axial mid portion 'A' (FIG. 1) a ring of stiff structure whose axial length is short relative to its diameter and supported but not fixedly so, in spaced apart relationship with outlet guide vane shrouds 44, by spacers 52. Portion 'A' has an aperture 64 therein positioned so as to allow suspension means 48 to protrude through for attachment to rigid beam 24.

Axial upstream portion 'B' comprises the fan air intake and is bolted rigidly to portion 'A' but only connects slidingly at 78 with the upstream end of pylon 22 for reasons to be explained in due course.

Axial portion 'C' comprises the thrust reverser apparatus 39 which is bolted all around its upstream end to mid portion 'A' and is jointed at one point only, namely joint 42 to rigid beam 24 as described heretofor. Thrust reverser 39 may be of the type disclosed in the common assignee's U. S. Pat. No. 3,604,629 issued Sept. 14, 1971 to Francis J. Colville, and to this extent the disclosure of this patent is incorporated by reference.

Axial portion D includes the fan propulsion nozzle 28 and this portion is bolted to the downstream end of reverser apparatus 39.

There is a small clearance 80 between fan cowl 16 and pylon 22 so as to ensure that the only physical connection between them is at the sliding interface at 78 and ball joint 42.

The only remaining portion of the fan cowl 16 is the portion 66 which defines the outer wall of the fan duct proper. This portion comprises two thin cylindrical members 66a and 66b which are bolted to the upstream and downstream edges respectively of shrouds 44 and so, in effect, are integral with core engine 12. Portion 66a extends upstream sufficiently to overlap fan blades 18 with a radial clearance therebetween.

Portion 66b extends downstream to meet in sliding, sealing arrangement with a sealing ring 68 provided on a re-entrant part mid cowl portion 'A.' This is the only physical connection between the fan duct outer wall and the remainder of the fan cowl.

Reference to FIG. 1 shows that the intake duct wall 82 of fan air intake 'B' extends downstream and overlaps the upstream end of fan duct portion 66a with a radial space 70 therebetween. The arrangement is such that in operation intake duct boundary layer air is passed directly through space 70 instead of over the tips of fan blades 18. It has been found that the removal of the boundary layer air thus, ensures that substantially no turbulent air reaches the tips of blades 18 and a significant noise reduction is achieved thereby. However, it is important that air does not flow in the opposite direction through space 70 to the intake so a one way valve in the form of a diaphragm seal 72 is fitted across the downstream end of space 70. Seal 72 is fixed to mid cowl portion 'A' and merely presses lightly on fan duct portion 66a, in such a manner that higher pressure air upstream lifts it off fan duct 66a and higher pressure downstream presses it more firmly onto fan duct 66a.

Thus there is provided a gas generator core engine whose dead weight and thrust loads are all taken by the strongest piece of its suspension structure, namely rigid beam 24 and a fan cowl having only one fixed point at 42 and which is subject to none of the core engine thrust loads and a fan duct outer wall 66 which has only the static pressures of the fan air flowing straight through it to contend with. This of course permits a substantially stress free fan cowl and duct wall structure of relatively light construction.

I claim:

1. In combination with aircraft structure, an arrangement for mounting a gas turbine ducted fan engine from the aircraft structure comprising: a gas generator core engine having a casing, a streamlined cowl surrounding said core engine and spaced from the casing thereof, an annular duct between said core engine and said cowl and having an inner wall and an outer wall, a stage of fan blades mounted on the upstream end of said core engine for accelerating air through said duct, suspension means for suspending said core engine from said aircraft structure, at least one cylindrical member rigidly supported by said core engine and forming a portion of said outer wall of said annular duct, said outer wall having a remaining portion formed by said cowl, said cylindrical member being positioned radially outwardly of and around said stage of fan blades, and means for mounting said cowl on said aircraft structure independently of said core engine and said at least one cylindrical member whereby any deformation of the cowl during operation does not interfere with the tips of said fan blades.

2. The combination as claimed in claim 1 including means to articulately fix said streamlined cowl at a point downstream of its mid length to said aircraft structure, and in which resilient means support said streamlined cowl at positions upstream of its mid length operatively on said core engine.

3. The combination as claimed in claim 2 in which said means for articulately fixing said cowl to said aircraft structure is a ball joint means.

4. The combination as claimed in claim 2 in which said resilient support means comprises a link and boss arrangement.

5. The combination as claimed in claim 2 including anti rotation links further connecting said cowl to said aircraft structure.

6. The combination as claimed in claim 1 in which said aircraft structure comprises a rigid beam.

7. The combination as claimed in claim 6 in which said rigid beam is a pylon.

* * * * *